United States Patent [19]

McSweeney

[11] 4,205,812

[45] Jun. 3, 1980

[54] AIRCRAFT LANDING WHEEL ROTATING DEVICE

[76] Inventor: William F. McSweeney, 12373 Warwick Blvd. - 4B, Newport News, Va. 23606

[21] Appl. No.: 24,714

[22] Filed: Mar. 28, 1979

Related U.S. Application Data

[63] Continuation-in-part of Ser. No. 888,760, May 1, 1978, abandoned.

[51] Int. Cl.² ............................................. B64C 25/40
[52] U.S. Cl. .................................................. 244/103 S
[58] Field of Search ...................... 244/103 S; 152/154

[56] References Cited

U.S. PATENT DOCUMENTS

2,397,319  3/1946  Johnson ............................ 244/103 S
2,408,963  10/1946  Westcamp ....................... 244/103 S

FOREIGN PATENT DOCUMENTS

583550  10/1958  Italy ..................................... 244/103 S

Primary Examiner—Barry L. Kelmachter
Attorney, Agent, or Firm—William Jay Monahan

[57] ABSTRACT

An aircraft landing wheel rotating device including a body portion eccentrically secured to the outer face of the landing wheel hub. A series of like air-receiving portions extend outwardly from the body member in spaced relation for catching the wind and effecting rotation of the wheel prior to landing.

10 Claims, 5 Drawing Figures

AIRCRAFT LANDING WHEEL ROTATING DEVICE

This is a continuation-in-part of application Ser. No. 888,760, filed May 1, 1978 now abandoned.

BACKGROUND OF THE INVENTION

At the present time, when conventional aircraft land, the entire aircraft is subjected to tremendous forces when the wheels touch the ground, which forces are transmitted through the entire plane structure, the fuselage, the wings and the empennage. The repeated exertion of these forces on the parts produces fatigue and ultimate failure of structural components of the aircraft. The violent shock to the aircraft upon landing further results in loss of complete pilot control over the aircraft during the landing procedure, with resultant danger to the safety of the passengers aboard the aircraft.

Various attempts have been made to mitigate these forces by rotating the aircraft wheels in the direction of travel, examples of such devices being illustrated in U.S. Pat. Nos. 2,408,263, 2,464,872 and 4,040,582. Devices for carrying out the wheel rotation, however, require extensive modification or replacement of existing aircraft wheel structure, thereby resulting in considerable expense for manufacture and installation.

SUMMARY OF THE INVENTION

The present invention is an aircraft landing wheel rotating device which is of simple, economic construction and may be readily applied to conventional aircraft with a minimum of time and effort and which, by virtue of their function of rotating the landing wheels of an aircraft prior to touching down, reduce the shock to the aircraft, enable the pilot to retain greater control over the aircraft, and reduces the danger to passengers during the landing procedure.

The wheel rotating device of the present invention preferably includes a body portion which is adhered to the outer surface of the wheel hub, the device further including a series of spaced concavo-convex portions extending outwardly from the body portion which are so constructed to catch the wind at intervals to produce rotation of the aircraft wheel in the direction of movement of the aircraft.

In accordance with the present invention, a plurality of the wheel rotating devices are eccentrically secured to the hub portion of the wheel in spaced relationship by adhesive means, so that installation thereof may be readily effected without modification of the landing craft wheel structure, and without the necessity of applying the same to the aircraft wheel by extraneous clips or other fastening means.

DETAILED DESCRIPTION OF THE INVENTION

Figure 3:
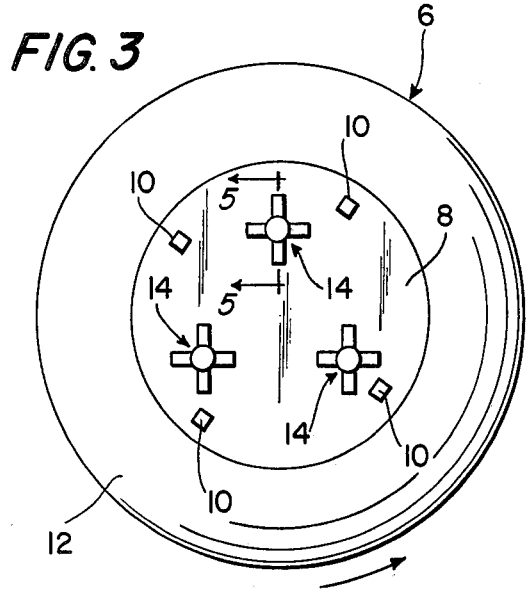
FIG. 3 is a side elevational view of an aircraft landing wheel illustrating the application of the device of the present invention.
Figure 4:
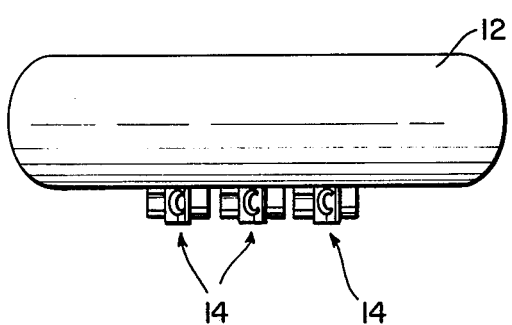
FIG. 4 is a top plan view of an aircraft landing wheel illustrating use of the present invention.
Figure 5:
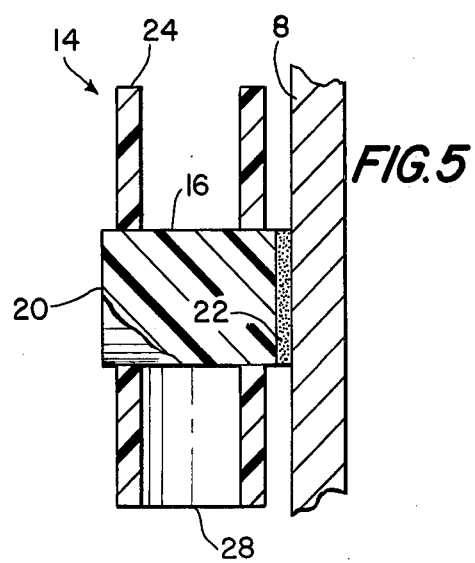
FIG. 5 is a fragmentary, enlarged sectional view taken along the lines 5—5 of FIG. 3, looking in the direction of the arrows.

In FIGS. 3, 4 and 5, there is illustrated a conventional aircraft landing wheel generally designated 6 having a hub 8 which is secured to the aircraft understructure by bolt and nut assemblies 10. Wheel 6 further includes a tire 12 which is mounted on hub 8.

In accordance with the present invention, a plurality of air-actuated wheel-rotating devices 14 are eccentrically secured to the outer face of hub 8 in substantially equally spaced relationship, for effecting rotation of wheel 6 in the direction of travel of the aircraft, i.e. clockwise for the right wheel and counterclockwise for the left wheel.

Figure 1:
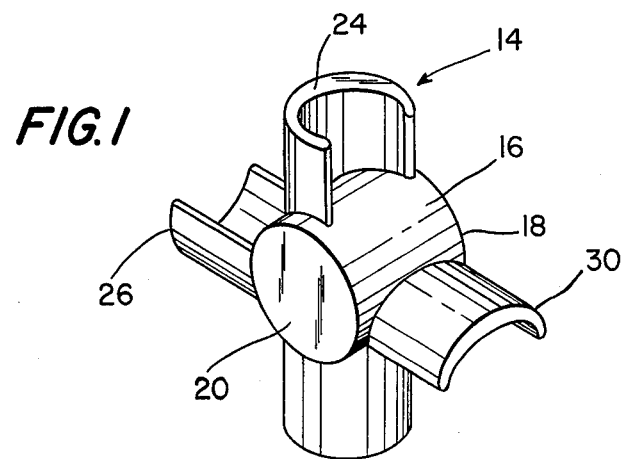
FIG. 1 is an enlarged perspective view of a wheel rotating device constructed in accordance with the present invention.
Figure 2:
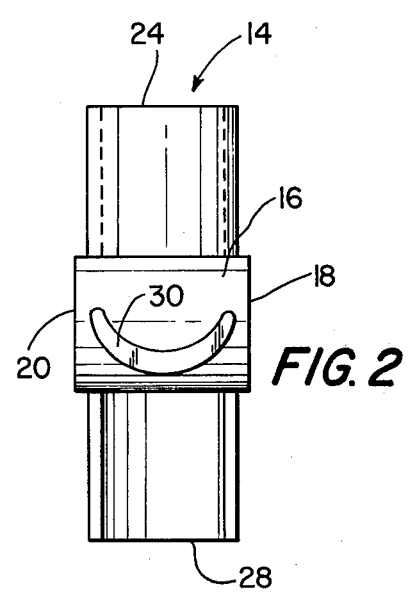
FIG. 2 is an end elevational view.

As shown in the advantage in FIGS. 1 and 2, each wheel-rotating device 14 is of generally cross shape and includes a central body portion 16 which is of cylindrical construction, the body portion being closed at both ends by faces 18 and 20. A suitable adhesive, such as epoxy cement or other high strength adhesive product, is selectively applied to faces 18 and 20, depending upon whether the device is to be applied to the hub of the left or right wheel of the aircraft. If desired, adhesive may be applied to a face of body portion 16 at the time of manufacture and covered by a protective sheet which is removed just prior to attachment to the wheel.

Device 14 further includes a plurality of like, wind-catching portions 24, 26, 28 and 30 which are of generally semi-cylindrical shape, having concave and convex surfaces, the former being adapted to catch the wind for effecting rotation of the aircraft landing wheel in accordance with the principle objective of the present invention. The convex surface of portions 24, 26, 28 and 30 permit wind to pass thereover without appreciably impeding rotation of the aircraft wheel.

It will be noted from FIGS. 1 and 2 that semi-cylindrical portions 24, 26, 28 and 30 are arranged at 90° intervals around the body portion periphery, with diametrically opposed portions 24, 28 and 26, 30 so arranged that the convex and concave surfaces thereof face in opposite directions. The central part of portions 24, 26, 28 and 30 may be thickened for added strength.

The wheel rotating device of this invention preferably of unitary construction for ease of manufacture, and may be molded or stamped of suitable low cost metallic or plastic materials, thereby permitting the economic manufacture thereof in quantity. Also, by virtue of the structural arrangement of the body portion and wind catching portions, the device is capable of withstanding the stress forces exerted by the dynamic air masses acting thereon.

In use of the present device, at least one, and preferably two or three, wheel-rotating devices are attached to the outer surface of the hub by means of adhesive 22 in substantially equally spaced relationship to each other and eccentrically of the hub. By virtue of the use of an adhesive, rather than extraneous fastening means, attachment to the aircraft wheel is readily effected in a minimum of time and with a minimum of effort.

As shown in FIGS. 3, 4 and 5, wheel-rotating devices 14 extend outwardly beyond the plane of the wheel so that the devices are in the path of the wind, which is first caught by the concave surface of upper-most portion 24, for example, and then successively by the concave surfaces of portions 30, 28 and 26 as the wheel is rotated by the dynamic forces of the wind striking the concave surfaces. Rotation of the aircraft front wheels is thereby effected in the direction of travel of the aircraft so that, when the aircraft lands, the pre-rotated wheels are already moving in the appropriate direction, thereby considerably mitigating the forces exerted on the wheels when they touch the ground, and reducing the shock to the structural components of the aircraft.

The wheel rotating device of the present invention may be of any suitable size depending upon the size of the wheel to be rotated and, correspondingly, the number of devices to be applied to each wheel may vary with the size of the aircraft and the landing speed, different rotational speeds of the wheels being desirable for different aircraft to effect the smoothest possible landing. The structural arrangement of the present wheel-rotating device enables the same to be manufactured at extremely low costs and to be applied to aircraft wheels of conventional construction without change or modification thereof. The use of an adhesive for engagement with the aircraft wheel facilitates attachment to the wheel hub, and enables this operation to be carried out quickly without the use of tools or mechanical attachment members.

While there has been herein shown and described the presently preferred form of this invention, it is to be understood that such has been done for purposes of illustration only, and that various changes may be made therein within the scope of the appended claims.

What I claim is:

1. In combination with an aircraft landing wheel having a hub on which a tire is mounted, a wheel-rotating device including:
   (a) a body portion;
   (b) wind-catching means for aerodynamically rotating the aircraft landing wheel, said wind-catching means including a plurality of semi-cylindrically shaped members attached to said body portion; and
   (c) means for securing said body portion and said wind-catching means to the aircraft wheel wherein the cylindrical axes of said semi-cylindrically shaped members are approximately parallel to the outer side wall surface of the aircraft wheel.

2. The wheel-rotating device of claim 1, wherein said body portion is of substantially cylindrical shape and the cylindrical axes of said semi-cylindrically shaped members are approximately perpendicular to the cylindrical axis of said body portion.

3. The wheel-rotating device of claim 2, wherein said semi-cylindrically shaped members are in equally spaced relationship at 90° intervals around the periphery of said body portion and wherein said semi-cylindrically shaped members include a concave surface which the wind engages during a segment of the wheel's rotation, and a convex surface over which the wind passes during another segment of the wheel's rotation.

4. The wheel-rotating device of claim 3, wherein:
   (a) the concave and convex surfaces of diametrically opposed ones of said members face in opposite directions.

5. The wheel-rotating device of claim 1, wherein:
   (a) said means for securing the device to the aircraft wheel is an adhesive.

6. In combination with an aircraft landing wheel having a hub on which a tire is mounted.
   (a) a plurality of wheel-rotating devices
   (b) each of said wheel-rotating devices including a body portion of cylindrical shape
   (c) a plurality of wind-catching portions extending outwardly from the periphery of said cylindrical shaped body portions in spaced relation to each other, and
   (d) means for securing each of said wheel-rotating devices to the wheel hub in spaced relation and eccentrically of the hub, whereby the wind successively engages said wind-catching portions of each wheel-rotating device to effect rotation of the wheel.

7. The wheel rotating device of claim 6, wherein:
   (a) said wind-catching portions are of semi-cylindrical shape and include a concave surface which the wind engages during a segment of the wheel's rotation, and a convex surface over which the wind passes during another segment of the wheel's rotation.

8. The wheel rotating device of claim 7, wherein:
   (a) said wind-catching portions are in equally spaced relationship at 90° intervals around the periphery of said body portion.

9. The wheel-rotating device of claim 8, wherein:
   (a) the concave and convex surfaces of diametrically opposed wind-catching portions face in opposite directions.

10. The wheel-rotating device of claim 6, wherein:
    (a) the ends of said cylindrical shaped body portion are closed by faces, and
    (b) said means for securing said wheel-rotating device to the wheel hub comprises an adhesive selectively applied to one of said body portion faces.

* * * * *